(12) United States Patent
Mirza et al.

(10) Patent No.: US 9,507,701 B2
(45) Date of Patent: Nov. 29, 2016

(54) SELF-SERVE DIAGNOSTIC TOOLS FOR NETWORK SERVICES

(71) Applicant: Verizon Patent and Licensing Inc., Basking Ridge, NJ (US)

(72) Inventors: Momin Mirza, Santa Clara, CA (US); Gaurav Gupta, San Jose, CA (US); Manish Sharma, San Jose, CA (US); Susan Kelly, Maynard, MA (US); Gyanesh Pandey, San Jose, CA (US); Ranjeev Mahtani, San Francisco, CA (US); Gilda Majidi, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 53 days.

(21) Appl. No.: 14/695,186

(22) Filed: Apr. 24, 2015

(65) Prior Publication Data

US 2016/0314066 A1    Oct. 27, 2016

(51) Int. Cl.
*G06F 11/00*   (2006.01)
*G06F 11/36*   (2006.01)
*H04L 29/08*   (2006.01)
*G06F 9/445*   (2006.01)

(52) U.S. Cl.
CPC ............ *G06F 11/3692* (2013.01); *G06F 8/60* (2013.01); *G06F 11/3684* (2013.01); *G06F 11/3688* (2013.01); *H04L 67/10* (2013.01); *H04L 67/16* (2013.01); *H04L 67/34* (2013.01)

(58) Field of Classification Search
USPC ...................................................... 714/25, 26
See application file for complete search history.

(56) References Cited

U.S. PATENT DOCUMENTS

| 2014/0310679 A1* | 10/2014 | Bhattacharya | G06F 11/362 717/102 |
| 2015/0120555 A1* | 4/2015 | Jung | G06Q 20/40 705/44 |
| 2016/0134689 A1* | 5/2016 | Vendrow | H04L 67/104 709/204 |

* cited by examiner

*Primary Examiner* — Sarai Butler

(57) ABSTRACT

A network device receives a collection of technical steps for implementing a type of service campaign. The technical steps include application programming interface (API) level calls to a service provider network. The network device associates the technical steps with particular customer software, receives validation criteria for each of the technical steps, generates a diagnostic map of the technical steps for the particular customer software, and conducts, based on the diagnostic map, a test of the API level calls for the particular customer software to obtain test results. The network device receives a customer deployment record of changes occurring during software deployments for the service campaign for the particular customer software and receives a provider record of service provider changes to network level software that impact the service campaign for the particular customer software. The network device correlates the test results with the customer deployment record and the provider record.

20 Claims, 10 Drawing Sheets

SELF-SERVE DIAGNOSTIC TOOLS FOR NETWORK SERVICES

BACKGROUND

An API (Application Programming Interface) uses a collection of software functions and procedures, referred to as API calls, that can be executed by other software applications. Service providers (e.g., telecommunications providers) may provide APIs that customers can use to access services/features that are included in software products that customers may eventually offer to consumers (e.g., end users). Testing/trouble-shooting of a customer service campaign that incorporates APIs from the service provider often requires cooperation between the service provider and the customer. Typically, when customers experience degraded performance and/or fail, a customer may initiate a service call to the service provider for trouble-shooting or instructions.

DETAILED DESCRIPTION OF THE PREFERRED EMBODIMENTS

The following detailed description refers to the accompanying drawings. The same reference numbers in different drawings may identify the same or similar elements.

Systems and methods described herein provide diagnostic and monitoring information to customers of a service provider network. Customers of the service provider network may be enterprise customers that provide content to end-users (referred to herein as "consumers"). The diagnostic and monitoring information may be accessible via a self-serve web portal to reduce the need for customer support calls and reduce wait times to obtain service status. As described further herein, customers (e.g., enterprise network customers) may initiate testing of application programming interface (API) level calls associated with code from the service provider. Diagnostic results may be provided to each of the customers in a controlled manner. In one implementation, the systems and methods may automatically correlate results and/or performance of the API level calls with automated or manual changes occurring during software deployments done at the application layer, for a user-interface portal or business logic serving particular customer campaigns. In another implementation, the systems and methods may automatically correlate results and/or performance of the API level calls with changes occurring on the service provider network level software to help troubleshoot customer problems.

Figure 1:
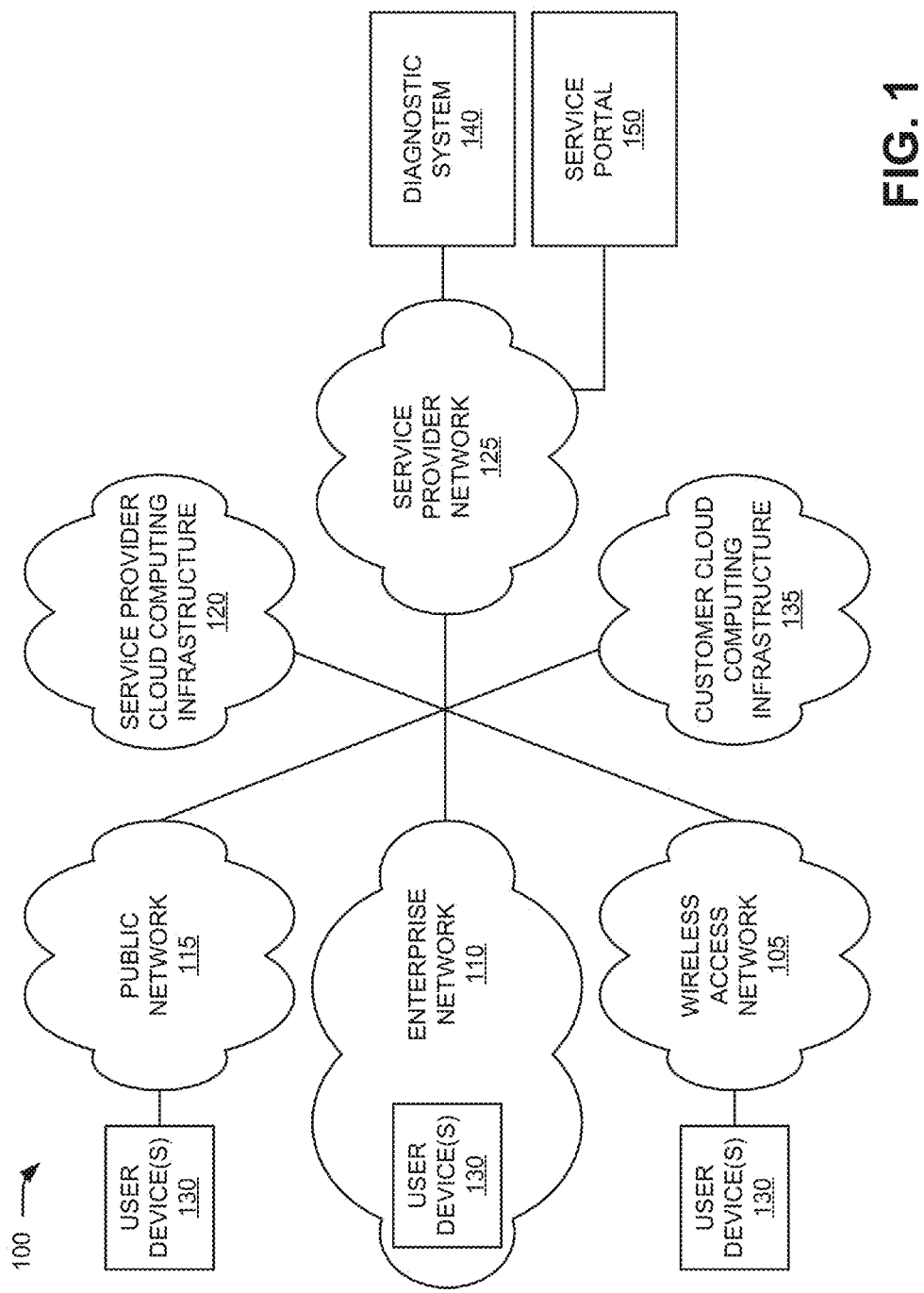
FIG. 1 is a diagram that depicts an exemplary network environment in which systems and methods described herein may be implemented.

FIG. 1 is a diagram that depicts an exemplary network environment 100 in which systems and methods described herein may be implemented. As shown in FIG. 1, network environment 100 may include a wireless access network 105, an enterprise network 110, a public network 115, a service provider cloud computing infrastructure 120, a service provider network 125, and a customer cloud computing infrastructure 135. Each of wireless access network 105, enterprise network 110, and public network 115 may include or provide communications to one or more user devices 130 (also referred to herein collectively as "user devices 130" and individually as "user device 130"). Service provider network 125 may include (or be in communication with) a diagnostic system 140 and a service portal 150. Components of network environment 100 may be connected via wired and/or wireless links. In one implementation, components in network environment 100 may communicate using application programming interfaces (API) to regulate interactions between devices and systems.

Wireless access network 105 may correspond to a Long Term Evolution (LTE) access network or another broadband cellular network. Wireless access network 105 may include one or more devices that implement logical entities interconnected via standardized interfaces, and that provide wireless packet-switched services and wireless IP connectivity for both data and voice services. Wireless access network 105 may include a base station or eNodeB, a mobility management entity (MME), a serving gateway (SGW), a packet data network gateway (PGW), a home subscriber server (HSS), and other network devices. While implementations herein are described primarily in the context of wireless access network 105 providing broadband services via LTE, other wireless protocols may be used. For example, components conforming to LTE standards described herein may be replaced by components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Enterprise network 110 may include a local area network (LAN), a wide area network (WAN), or a combination of networks that provide network access for end users. In one implementation, enterprise network 110 may include a network interconnecting one or more user devices 130, such as devices providing data services (e.g., personal computers, workstations, laptops, etc.), devices providing voice services (e.g., telephones), and/or devices providing video services (e.g., televisions, set-top boxes, etc.). In another implementation, enterprise network 110 may include one or more gateway (GW) routers (e.g., customer premises equipment) that provide act as a secure gateway for devices within enterprise network 110.

Public network 115 may include a WAN, an intranet, a telephone network (e.g., the Public Switched Telephone Network), or a combination of networks. Public network 115 may include, for example, an untrusted network, such as the Internet. Public network 115 may further include transport and/or network devices such as routers, switches, and/or firewalls.

Service provider cloud computing infrastructure 120 may include network devices, computing devices, and/or storage devices to provide shared resources to users of wireless access network 105, enterprise network 110, public network 115, and/or service provider network 125. Services provided by service provider cloud computing infrastructure 120 may include, for example, computing as a service, cloud storage, a hosted voice-over-Internet Protocol (VoIP) service, a Network Address Translation (NAT) service, a Virtual Private Network (VPN) service, a firewall service, an Intrusion Detection and Prevention System (IDPS), an email filtering service, a filtering service for a particular web site, a load balancing service, a video distribution service, a lawful intercept service on behalf of a law enforcement entity, and/or any other type of service that be provided by a cloud computing environment.

Service provider network 125 may include one or more wired, wireless and/or optical networks that are capable of receiving and transmitting data, voice and/or video signals, including multi-media signals that may include voice, data and video information (generally referred to herein as "services"). Service provider network 125 may include a WAN, a metropolitan area network (MAN), an ad hoc network, an intranet, a satellite based network, a fiber optic-based network, and/or a combination of these or other types of networks. Additionally or alternatively, service provider network 125 may include a cellular network, the Public Land Mobile Network (PLMN), and/or another mobile network. In some implementations, service provider network 125 may provide redundancy and/or the ability to distribute network loads. For example, service provider network 125 may include an IP network or a multiprotocol label switching (MPLS) network implementing an Interior Gateway Protocol (IGP) or another protocol that implements a minimum cost end-to-end path for routing between nodes. Service provider network 125 may provide one or more interfaces to connect to client devices (e.g., user devices 110 or other devices residing on enterprise network 110).

User device 130 may include a mobile electronic device or a stationary electronic device that is capable of communicating with other devices in the customer premises. User device 130 may also communicate with rules server 150, notification server 170, web server 190, and/or other devices via network 195. In one implementation, user device 130 may provide an interface to configure customer diagnostics and/or receive service notifications from notification server 170. In one implementation, user device 130 may also be a mobile computing device, such as a smartphone, smartwatch, or tablet. In another implementation, user device 130 may include an Internet-enabled device such as a computer workstation, desktop computer, or another networked device. In still another implementation, user device 130 may include components of a television-based communication system, such as, for example, a set-top box (STB), a home media server, a gaming console, or an Internet television. In one implementation, user device 130 may include a wireless transceiver such as a Bluetooth transceiver, a near-field communications (NFC) transceiver, a Wi-Fi transceiver, and/or a Long-Term Evolution (LTE) transceiver. In another implementation, user device 130 may communicate via a wired Ethernet interface.

Customer cloud computing infrastructure 135 may include network devices, computing devices, and/or storage devices to provide shared resources to users of wireless access network 105, enterprise network 110, public network 115, and/or service provider network 125. Customer cloud computing infrastructure 135 may provide similar or different services than those of service provider cloud computing infrastructure 120. For example, in one implementation, services from customer cloud computing infrastructure 135 may be limited to registered users of enterprise network 110.

Diagnostic system 140 may include one or more devices, such as computer devices, network devices, and/or server devices, which are configured to provide configurable diagnostics for service provider network 125 and systems integrated with service provider network 125. Diagnostic system 140 may receive a collection of technical steps for implementing a particularly type of service campaign. Technical steps may generally include discrete tasks and/or subtasks, that are applicable to any customer, for implementing a service campaign. The technical steps may include use of application programming interface (API) level calls to service provider code residing on, for example, service provider cloud computing infrastructure 120, service provider network 125, or customer cloud computing infrastructure 135. In one implementation, diagnostic system 140 may enable a user to associate the technical steps with a particular customer software and validation criteria for each of the technical steps. As described further herein, diagnostic system 140 may then generate a diagnostic map of the technical steps for the particular customer software that may be used by the customer to conduct end-to-end testing (and/or customized testing) of a customer service campaign.

Service portal 150 may include one or more devices, such as server devices, that enable customers to configure and provide services to consumers (e.g., users using user devices 130). For example, service portal 150 may provide a web portal that may enable an operator of a particular enterprise network 110 to configure a service campaign. As a particular example, service portal 150 may enable customers (e.g., operators of enterprise network 110 or other content providers) to register billing accounts and particular content for toll-free data services.

Figure 2:
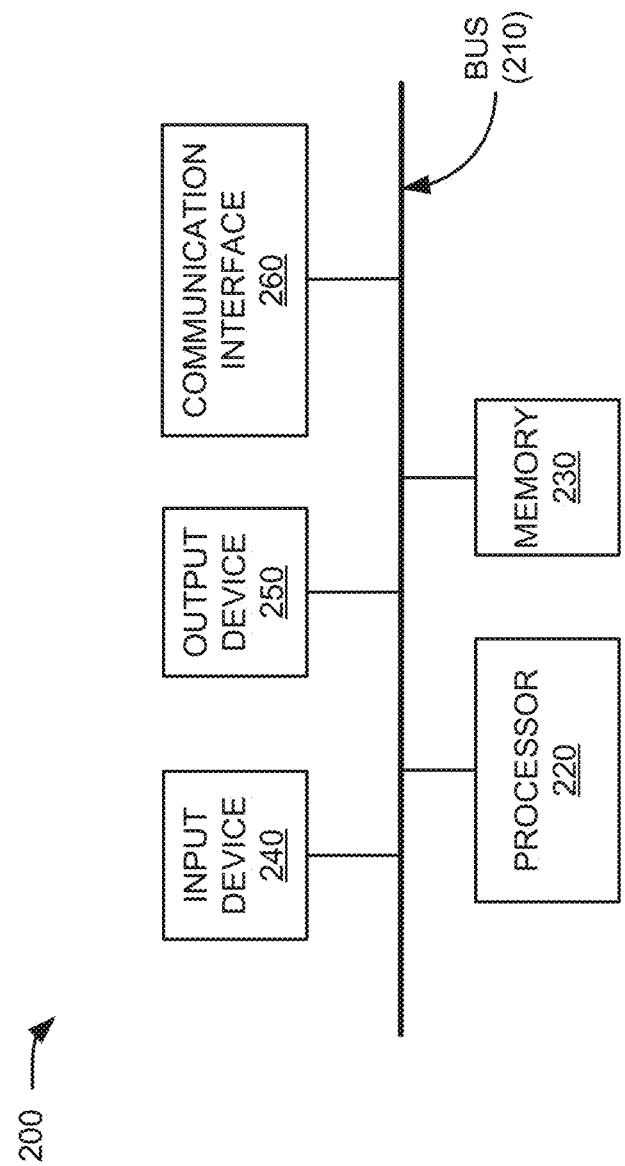
FIG. 2 is a diagram of exemplary components of one of the devices of FIG. 1.

FIG. 2 is a diagram illustrating exemplary components of device 200 according to an implementation described herein. Each of user devices 130, components within diagnostic system 140, and/or components within service portal 150 may include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a USB port for communications over a cable, a Bluetooth™ wireless interface, a RFID interface, a NFC wireless interface, and/or any other type of interface that converts data from one form to another form.

As will be described in detail below, device 200 may perform certain operations relating to processing data from monitored devices 110 and/or applying rules for one or more monitored devices 110. Device 200 may perform these operations in response to processor 220 executing software instructions contained in a computer-readable medium, such as memory 230.

Although FIG. 2 shows exemplary components of device 200, in other implementations, device 200 may include fewer components, different components, additional components, or differently-arranged components than those depicted in FIG. 2. Additionally or alternatively, one or more components of device 200 may perform one or more tasks described as being performed by one or more other components of device 200.

Figure 3:
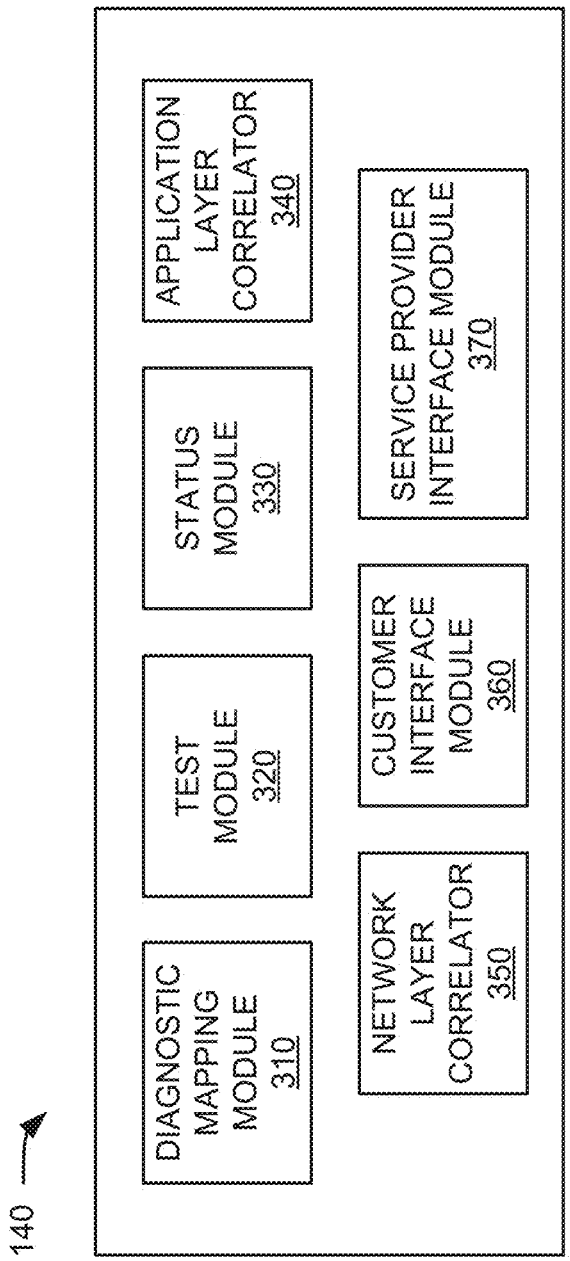
FIG. 3 is a block diagram of exemplary functional components of the diagnostic system of FIG. 1.

FIG. 3 is a diagram of exemplary functional components of diagnostic system 140. The functional components may be implemented by, for example, processor 220 in conjunction with memory 230. As shown in FIG. 3, diagnostic system 140 may include a diagnostic mapping module 310, a test module 320, a status module 330, an application layer correlator 340, a network layer correlator 350, a customer interface module 360, and a service provider interface module 370.

Diagnostic mapping module 310 may compile elements for detailed diagnostics and/or monitoring of a particular service (e.g., a service of the service provider being used by a customer). For example, for a particular service, diagnostic mapping module 310 may identify diagnostic scenarios for software operations testing. In one implementation, diagnostic scenarios may be identified by diagnostic mapping module 310 in conjunction with a customer using customer interface module 360. In another implementation, diagnostic scenarios may be identified by diagnostic mapping module 310 in conjunction with a network operator using service provider interface module 370. Example of diagnostic scenarios may include:

testing of a customer's own code integrated with the service provider's provided co-located libraries in a customer's cloud;

testing of a customer's own code on customer cloud computing infrastructure 135, calling out the service provider's provided APIs on service provider cloud computing infrastructure 120;

testing of a customer's own mobile application code integrated with the service provider's provided co-located SDK libraries running on a consumer's mobile user device;

testing of a third-party browser graphical user interface (GUI) experience on a consumer's user device when showing customer mobile web code integrated with the service provider's code (i.e., testing the GUI experience directly on the user device);

testing of a third-party browser GUI experience on a consumer's user device when showing customer mobile web code integrated with the service provider's code (i.e., testing the GUI experience virtually in a simulator);

testing of a third-party browser GUI experience on a mobile user device when showing customer mobile web code integrated with the service provider's code for a headless device, such as an Internet of Things (IoT) or machine-to-machine (M2M) device (i.e., testing the GUI experience directly on the consumer user device);

testing of a customer's mobile application code on a consumer's mobile user device integrated with the service provider's provided SDK libraries running on a headless IoT device, where the data is coming from a headless device that is connected to customer cloud computing infrastructure 135;

testing of a third-party browser GUI experience on a mobile user device when showing customer mobile web code integrated with the service provider's code for a headless device (i.e., testing the GUI experience virtually in simulator); or across the board mass testing for M2M devices for enterprise customer wanting to mass test all their devices.

Figure 4:
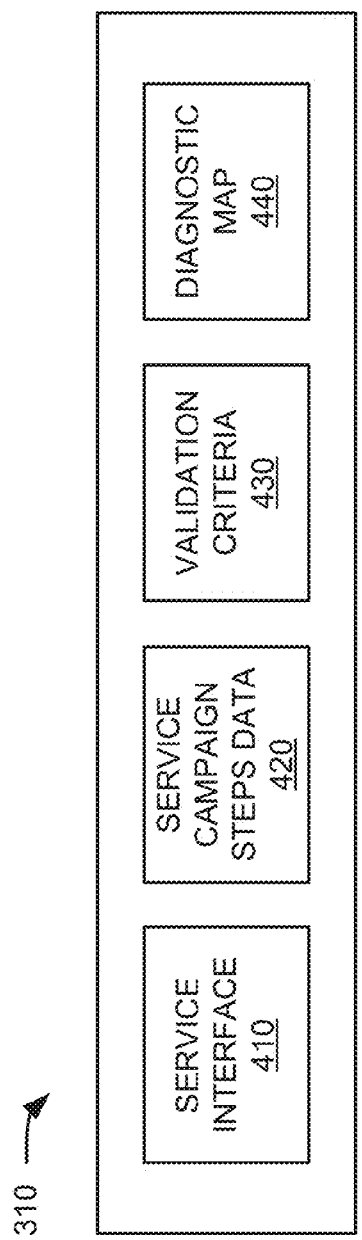
FIG. 4 is a block diagram of exemplary functional components of the diagnostic mapping module of FIG. 3.

FIG. 4 provides a diagram of exemplary functional subcomponents of diagnostic mapping module 310. As shown in FIG. 4, diagnostic mapping module 310 may include a service interface 410, service campaign steps data 420, validation criteria 430, and diagnostic map 440.

Service interface 410 may provide a connection for diagnostic mapping module 310 to access customer information from a particular service portal 150 (e.g., associated with a service to be tested), customer interface module 360, and/or service provider interface module 370. Service interface 410 may identify particular devices, addresses, ports, and other customer-specific information to perform end-to-end testing of a particular service campaign.

Service campaign steps data 420 may include a comprehensive listing of technical steps, associated with a service, that can be monitored and/or tested to diagnose performance. In one implementation service campaign steps may be provided by a service provider as part of a campaign configuration. In one implementation, service campaign steps data 420 may designate particular technical steps that can be tested and reported to the customer and other technical steps (or sub-steps) where the tested results may be limited to service provider viewing.

Validation criteria 430 may include criteria for each of the technical steps from service campaign steps data 420. For example, validation criteria 430 may include thresholds, ranges, pass/fail criteria, etc. to define performance of a technical step from service campaign steps data 420. Validation criteria 430 may be a generic value (e.g., not specific to a particular customer) or customized value for a particular customer. In one implementation, validation criteria 430 may be determined based on a customer service level agreement. In other implementations, validation criteria 430 may be set by a network administrator associated with the service provider or customer. Validation criteria 430 may include, for example, binary criteria (pass/fail) or conditional criteria (e.g., particular time windows, data rates, etc. to indicate ranges of performance, such as unacceptable, acceptable, and optimal).

Diagnostic map 440 may include a collection of technical steps (e.g., from service campaign steps data 420) and validation criteria (e.g., from validation criteria 430) for a particular service and customer. Diagnostic map 440 may provide a comprehensive software development test plan for the particular customer and service (e.g., applied to one or more of the diagnostic scenarios described above). As described further herein, diagnostic map 440 may be divided into building blocks to test individual aspects a software deployment.

Returning to FIG. 3, test module 320 may initiate diagnostic testing by applying information from diagnostic mapping module 310. Testing by test module 320 may be initiated, for example, through customer interface module 360 or service provider interface module 370. Test module 320 may collect and store test results. In one implementation, test module 320 may provide some or the entire test results to status module 330, customer interface module 360, and/or service provider interface module 370.

Status module 330 may evaluate test results from test module 320 and may interpret test results in light of validation criteria (e.g., validation criteria 430). In one implementation, status module 330 may assign a status indicator to a particular technical step or set of steps based on results from test module 320. For example, a status indicator may include a color, a number, a letter, etc. As an example of a color-based status indicator, one color (e.g., green) may indicate acceptable performance, another color (e.g., yellow) may indicate degraded performance, and still another color (e.g., red) may indicate a failure. In other implementations, a numeric scale (e.g., 1-5), a letter code (e.g., A, B, C, D, F), and/or key words (e.g., pass, fail, etc.) may be used as status indicators.

Status module 330 may also implement one or more algorithms to summarize a status of multiple technical steps (or subtasks) with a single status indicator. Depending on the algorithm, for example, status module 330 may summarize multiple subtasks that have degraded performance with a single 'failure' status. As another example, a group subtasks that have a combination of acceptable and degraded indicators may be shown with an acceptable indication. In one implementation, status module 330 may present the summary status to users (e.g., via user interface module 360), while presenting the summary status and underlying subtasks status to customers (e.g., via customer interface module 370). Status module 330 may also track and update historical test information such as "last successful execution," "last successful scheduled test," "last failure," "last smoke test," etc. associated with each technical step or a collection of technical steps.

Application layer correlator 340 may correlate test results and/or performance of API level calls with changes occurring during software deployments (e.g., automated or manual) done at the application layer (e.g., as defined by in the Open Systems Interconnection (OSI) model), for the GUI portal or the business logic of the monitored service. In one implementation, application layer correlator 340 may obtain access change records from one or more devices in enterprise network 110 or portal service 150 to track histories of application layer changes. Application layer correlator 340 may compare the histories of application layer changes with current and past tests performed by test module 320 and/or results from status module 330.

Network layer correlator 350 may correlate results and/or performance of API level calls with changes occurring on network level software (e.g., within service provider network 125) to help troubleshoot customer problems. In one implementation, network layer correlator 350 may obtain access change records from one or more other devices in service provider network 125 to track histories of network level software changes. Network layer correlator 350 may compare the histories of network level software changes with current and past tests performed by test module 320 and/or results from status module 330.

Figure 5:
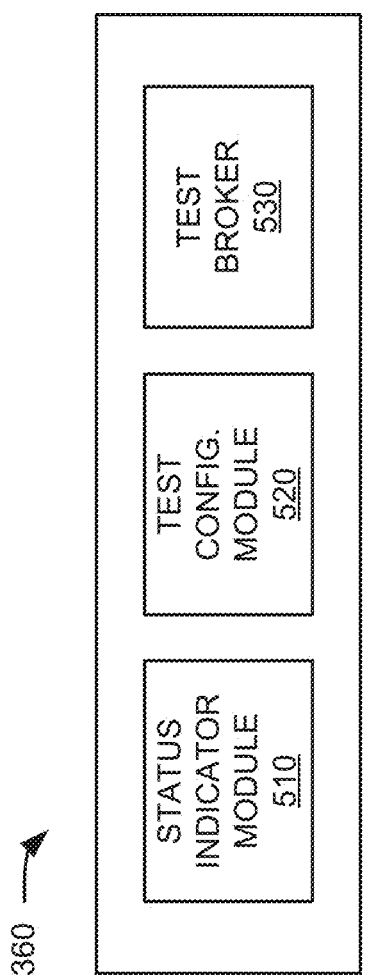
FIG. 5 is a block diagram of exemplary functional components of the customer interface module of FIG. 3.

Customer interface module 360 may provide a user interface to manage diagnostics and to present data, associated with a particular service and customer, from status module 330, application layer correlator 340, and/or network layer correlator 350. FIG. 5 provides a diagram of exemplary functional sub-components of customer interface module 360. Service provider interface module 370 may include similar functional sub-components. As shown in FIG. 5, customer interface module 360 may include a status indicator module 510, test configuration module 520, and test broker 530.

Figure 6:
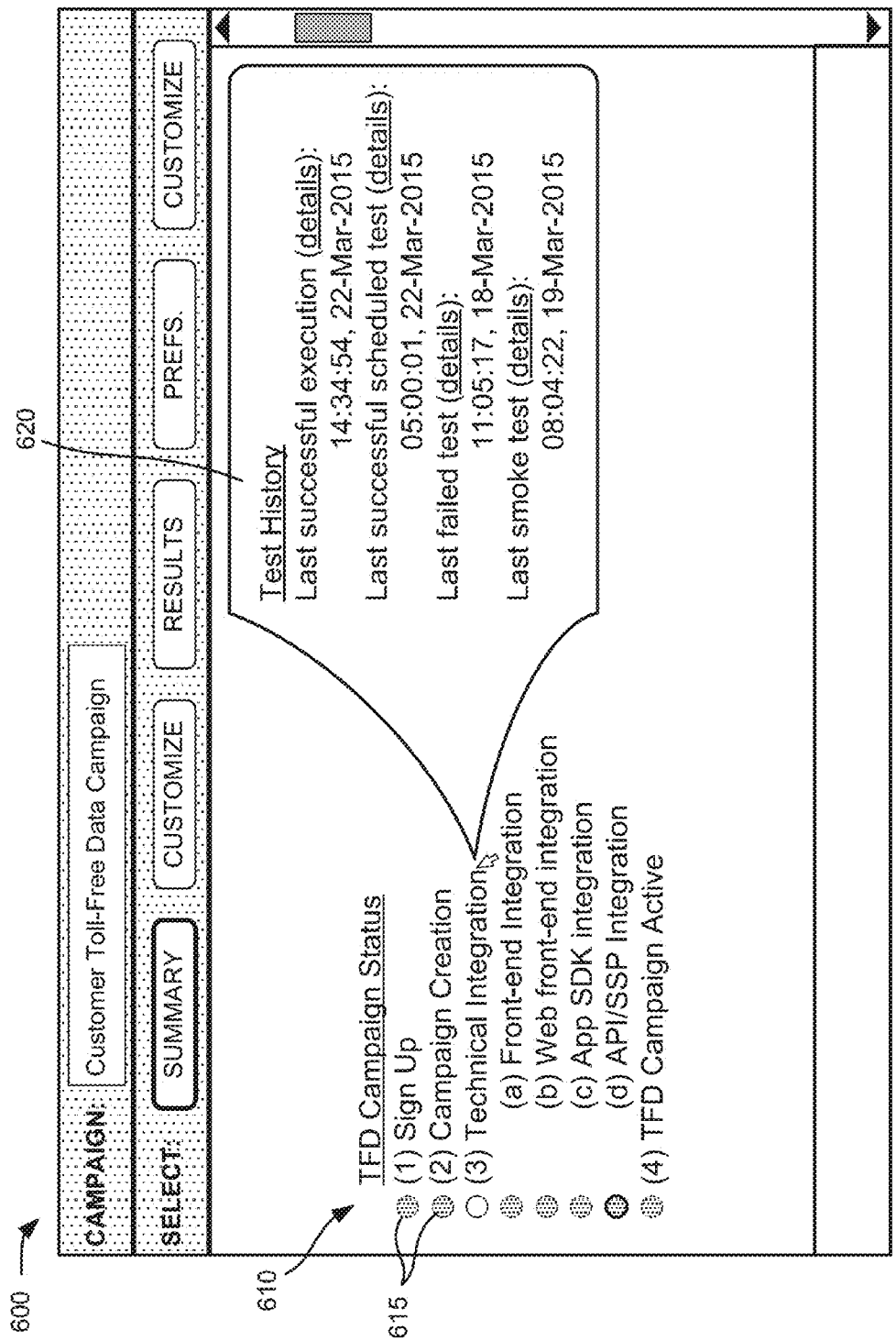
FIG. 6 is a simplified exemplary customer user interface for self-serve diagnosis of a service campaign.

Status indicator module 510 is described in the context of FIG. 6. FIG. 6 provides an exemplary user interface 600 that may be presented to a user of customer interface module 360. The particular example of FIG. 6 provides a simplified exemplary user interface for self-serve diagnosis of a service campaign. The example of FIG. 6 uses terminology for a toll-free data campaign, where an arrangement between a service provider and a customer (e.g., a content provider) allows mobile subscribers to access content without impacting their monthly wireless data plan. In a toll-free data campaign, websites or mobile apps registered as toll-free content will be free for the consumers, and data charges can be billed directly to the sponsoring customer instead of the consumer's personal account.

Status indicator module 510 may present coded indicators and historical information associated with a technical step or collection of technical steps for a particular service campaign. For example, as shown in FIG. 6, status indicator module 510 may provide a status section 610 of an overall software development campaign. Status section 610 may include the status of individual campaign steps (e.g., as tracked by status module 330) and may be presented with, in one example, status icons 615 that indicate whether a step (e.g., a step relating to a TFD campaign) is in compliance with validation criteria. For example, red (or bold) status icons 615 (e.g., next to "API/SSP Integration") may indicate that a step is out of compliance is needed; yellow (or solid-outlined) status icons 615 (e.g., next to "Technical Integration") may indicate that the corresponding step is providing acceptable but not optimal results; and green or dotted-outlined status icons 615 (e.g., next to "Sign up") may indicate that the corresponding step is providing optimal results within the validation criteria. As noted above in connection with status module 330, other forms of status indicators may be used for status icons 615.

Status indicator module 510 may also present test history information related to the technical steps for the particular service campaign. For example, as shown in FIG. 6, status indicator module 510 may provide a test history section 620. Test history section 620 may provide historical test information related to a particular section or group of sections. For example, test history section 620 may present test information from status module 330, such as "last successful execution," "last successful scheduled test," "last failure," "last smoke test," etc. associated with an end-to-end test of a campaign or one or more particular technical steps.

Figure 7:
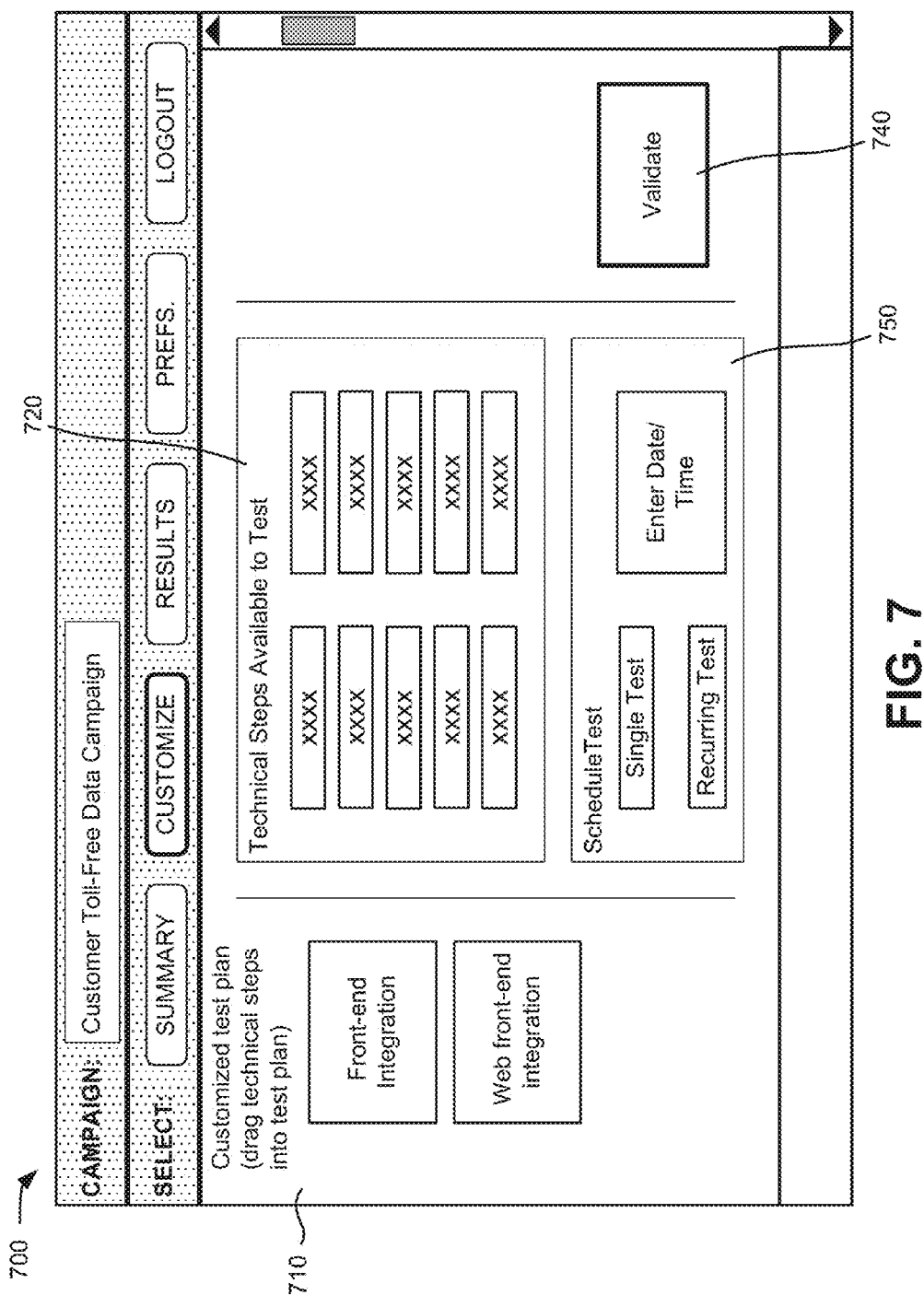
FIG. 7 is a simplified exemplary user interface for self-serve test configuration for a service campaign.

Test configuration module 520 and test broker 530 are described in the context of FIG. 7. FIG. 7 provides an exemplary user interface 700 that may be presented to a user of customer interface module 360. The particular example of FIG. 7 provides a user interface for configuring customized testing of a service campaign, such as a toll-free data campaign.

Test configuration module 520 may allow building of custom tests by the customer, combining building blocks of basic (and/or more complex) tests provided by the service provider, and third-party services (so it becomes possible for the customer to test "Was my campaign working within X % of best performance while I was pushing out a particular marketing tweet on Twitter"). For example, as shown in FIG. 7, test configuration module 520 may provide a customized test plan section 710 and an available technical steps section 720. According to one implementation, a user of user interface 700 may drag available test blocks from technical steps section 720 to customized test plan section 710 to form a customized test.

Test configuration module 520 may also allow ad hoc and scheduled execution of the tests/validations by the customer. For example, test configuration module 520 may provide a test scheduling section 730 to allow a user of user interface 700 to schedule a one-time or recurring test.

Test broker 530 may broker ad hoc or custom test execution commands thru a performance checking process so that tests cannot impact the overall system or particular customer service performance. For example, as shown in FIG. 7, a validation option 740 may be selected by a user of user interface 700 to validate a customized test. In one implementation, selection of validation option 740 may cause test broker 530 to evaluate current or projected network activity to ensure that a particular test can be performed at a scheduled time without adversely impacting network performance. In another implementation, selection of validation option 740 may cause test broker 530 to evaluate the combination of steps in customized test plan section 710 to ensure testing feasibility.

Figure 8:
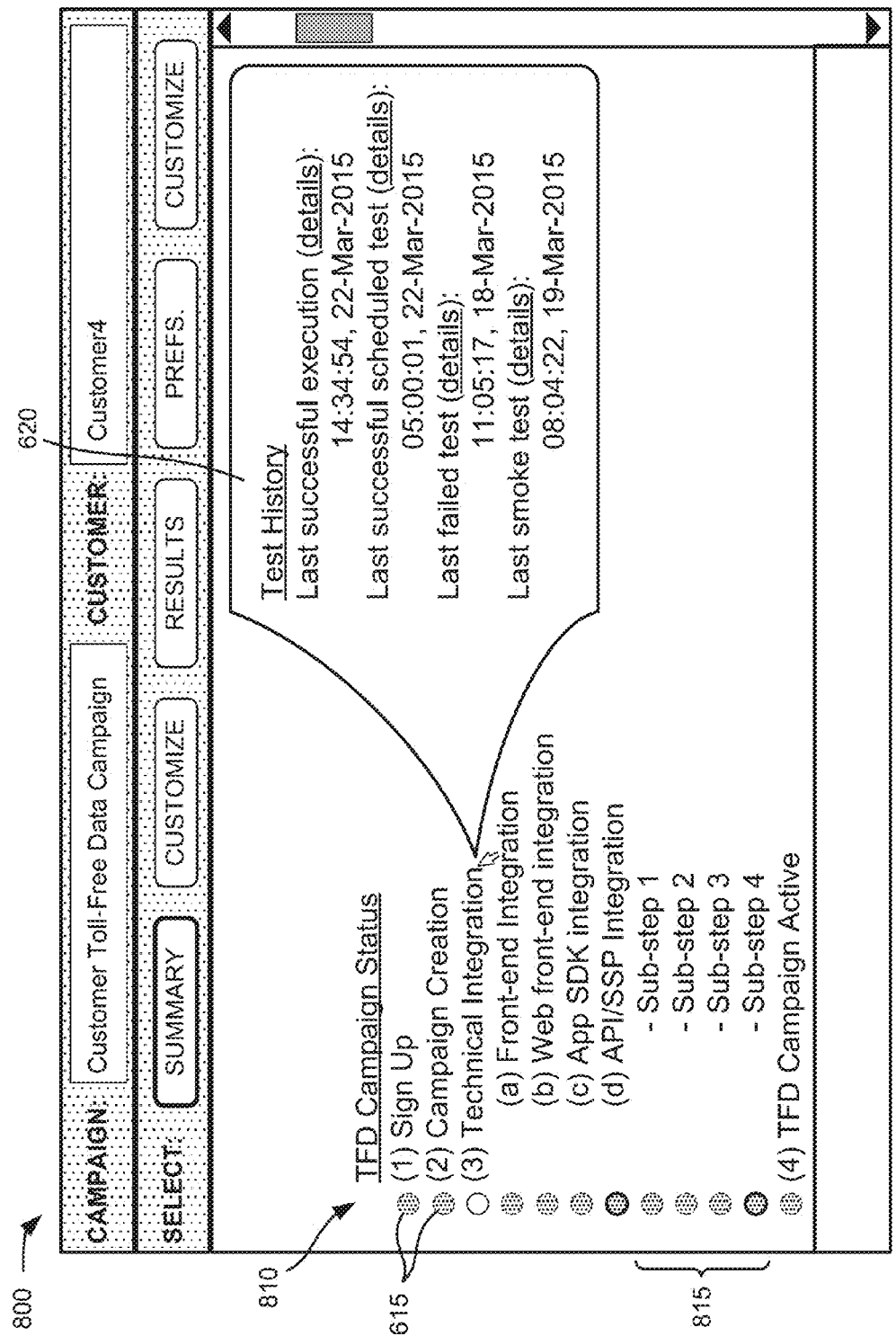
FIG. 8 is simplified exemplary user interface for service provider diagnosis of a service campaign.

Service provider interface module 370 is described in the context of FIG. 8. FIG. 8 provides an exemplary user interface 800 that may be presented to a network administrator for service provider network 125. The particular example of FIG. 8 provides a user interface for implementation of a toll-free data campaign. Service provider interface module 370 may provide a user interface to manage diagnostics and to present data, associated with a multiple services and/or customers, from status module 330, application layer correlator 340, and/or network layer correlator 350. For example, service provider interface module 370 may provide access to test results of ad hoc and scheduled tests run by different customers.

As shown in FIG. 8, service provider interface module 370 may provide a user interface 800 that is similar to user interface 600. A network administrator may select the status for a particular service campaign and customer. Service status section 810 may include information presented to customers in service status section 610 of user interface 600, along with addition information. Particularly, additional technical steps that are not privy to individual customers may be presented. The additional technical steps may be presented with status icons 815 that may follow the same code scheme as described above for status icons 615. For example, as shown in FIG. 8 additional steps and icons 815 for "API/SSP Integration" may be visible in user interface 800, but may be rolled up into a single indicator and status icon 615 when presented in user interface 600. In one implementation, user interface module service provider interface module 370 Service provider interface module 370 may also provide historical test data and customized testing similar to those described above in connection with user interfaces 600 and 700.

Although FIGS. 3-5 show exemplary functional components of diagnostic system 140, in other implementations, diagnostic system 140 may include fewer functional components, different functional components, or additional functional components than those depicted in FIGS. 3-5. For example, in other implementations, diagnostic system 140 may include interfaces to receive network or customer software updates from other systems.

Figure 9:
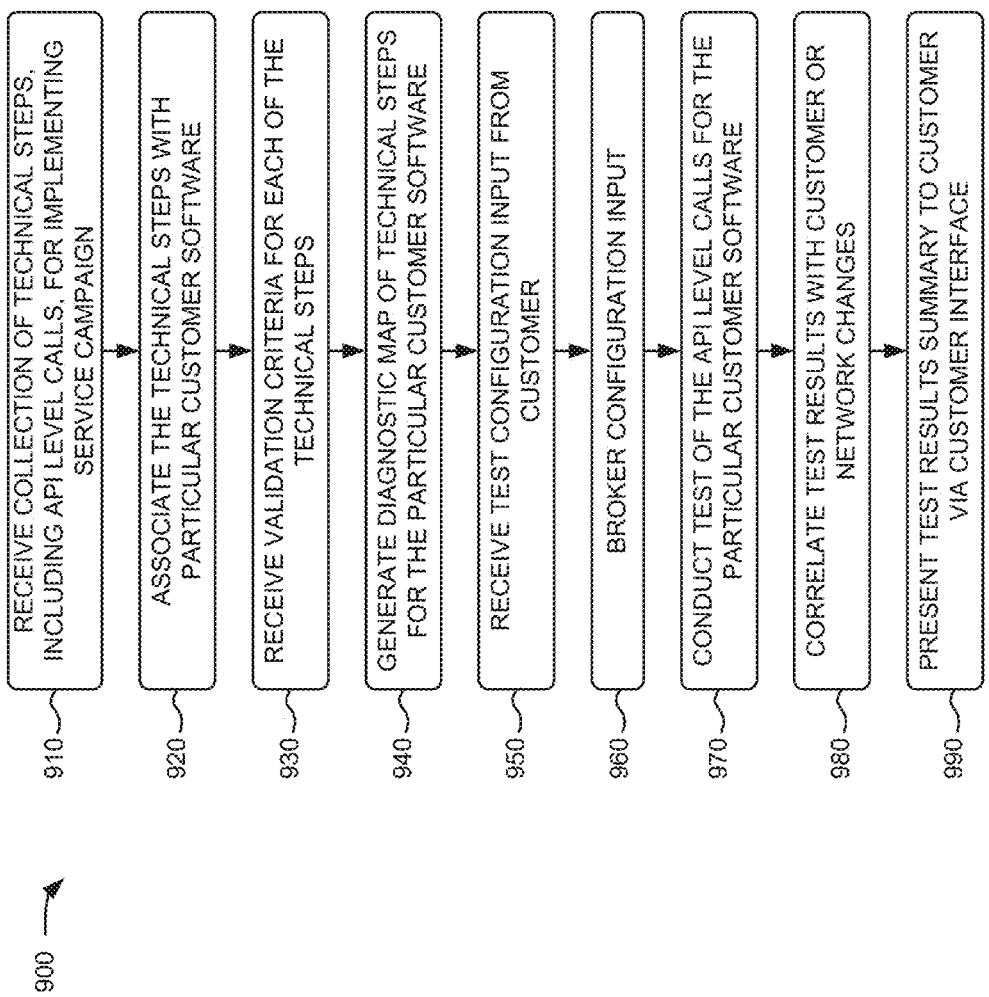
FIGS. 9 and 10 are flow diagrams that illustrate an exemplary process for implementing a self-serve diagnostic system for network services, according to an implementation described herein.

FIG. 9 is a flow diagram that illustrates an exemplary process 900 for implementing a self-serve diagnostic system for network services. In one implementation, process 900 may be implemented by diagnostic system 140. In another implementation, process 900 may be implemented by diagnostic system 140 in conjunction with one or more other devices in network environment 100, such as service portal 150.

Process 900 may include receiving a collection of technical steps, including API level calls, for implementing a particular service campaign (block 910), and associating the technical steps with the particular customer implementation (block 920). For example, for a given type of service campaign (e.g., a TFD service, etc.), a service provider may identify a list of technical steps (such as specific API calls) needed to integrate the service from the service provider with a customer's software. In one implementation, the list of technical steps may be particular to the offered service, but generic to any particular customer. In another implementation, there may be different technical steps needed for different customer platforms, such as a cloud-based platform, an enterprise/LAN platform, or a mobile platform. The technical steps may be matched to a particular customer's implementation of a service campaign to ensure integration of any service provider software (e.g., API calls) that are needed to implement the customer's software that offers a product (such as toll-free content) to consumers. For example, each of the API calls from the list of technical steps for a particular platform may be matched to corresponding customer code segments.

Process 900 may also include receiving validation criteria for each of the technical steps (block 930). For example, for each of the technical steps needed to integrate the service from the service provider, a network technician and/or customer technician may identify criteria to validate/verify that each technical step has been (and/or continues to be) executed properly. Criteria may include, for example, binary criteria (pass/fail) or conditional criteria (e.g., particular time windows, data rates, etc. to indicate ranges of performance, such as unacceptable, acceptable, and optimal).

Process 900 may further include generating a diagnostic map of technical steps for the particular customer software (block 940). For example, diagnostic system 140 may apply information obtained in blocks 910 and 920 to generate an end-to-end diagnostic map for testing the customer campaign. In one implementation, the diagnostic map may identify discrete test segments that may be used as "building blocks" for customized testing of discrete portions of the end-to-end testing.

Process 900 may additionally include receiving test configuration input from the customer (block 950), brokering the configuration input (block 960), and conducting a test of the API level calls for the particular customer software (block 970). For example, diagnostic system 140 (e.g., test configuration module 520) may allow scheduling of ad hoc tests and building of custom tests by the customer. Diagnostic system 140 (e.g., test broker 530) may ensure that test executions commands can be performed in a manner that does not adversely impact performance for the customer or service to other customers of service provider network 125. Diagnostic system 140 may perform scheduled or ad hoc testing based on the end-to-end diagnostic map and/or portions thereof. In one implementation, the testing may be based on user input from customer interface module 360.

Process 900 may further include correlating the test results, from the test of the API level calls, with customer or network changes (block 980) and presenting a summary of the test results to the customer via the customer interface (block 990). For example, diagnostic system 140 may collect test results and correlate the test results with system changes. As described in connection with FIG. 6, customer interface module 360 (e.g., status indicators 510) may present coded indicators (e.g., status icons 615) and historical information associated with a technical step or collection of technical steps of the service campaign.

Figure 10:
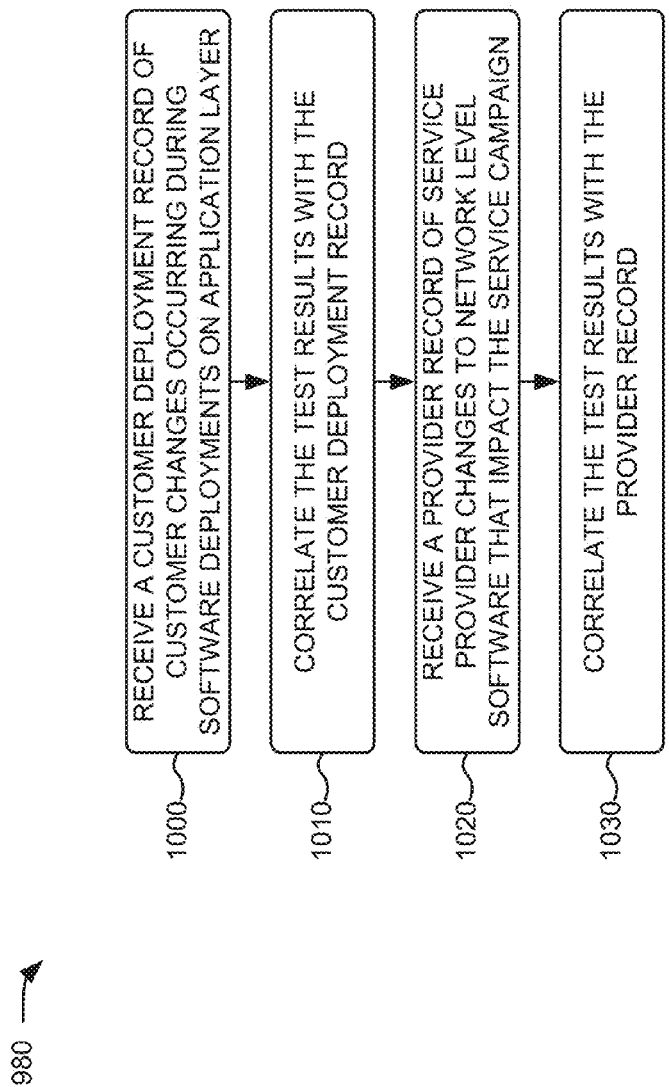

In one implementation, process block 980 may include the process blocks shown in FIG. 10. As shown in FIG. 10, process block 980 may include receiving a customer deployment record of customer changes occurring during software deployments on the application layer (block 1000) and correlating the test results with the customer deployment record (block 1010). For example, application layer correlator 340 may receive customer software development histories that indicate revision dates and/or change records. Application layer correlator 340 may correlate results and/or performance of API level calls with automated or manual changes occurring during software deployments.

Process block 980 may also include receiving a provider record of service provider changes to network level software that impact the service campaign (block 1020) and correlating the test results with the provider record (block 1030). For example, network layer correlator 350 may receive service provider revision records that indicate revision dates and/or change records. Network layer correlator 350 may match results and/or performance of API level calls with times and code sections of changes occurring on network level software.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 9-10, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, by a network device, a collection of technical steps for implementing a type of service campaign, wherein the technical steps include application programming interface (API) level calls to a service provider network;
  associating, by the network device, the technical steps with particular customer software;
  receiving, by the network device, validation criteria for each of the technical steps;
  generating, by the network device, a diagnostic map of the technical steps for the particular customer software;
  conducting, by the network device and based on the diagnostic map, a test of the API level calls for the particular customer software to obtain test results;
  receiving, by the network device, a customer deployment record of customer changes occurring during software deployments on an application layer for the service campaign for the particular customer software;
  receiving, by the network device, a provider record of service provider changes to network level software that impact the service campaign for the particular customer software;
  correlating, by the network device, the test results with the customer deployment record to obtain correlated customer test results;
  correlating, by the network device, the test results with the provider record to obtain correlated service provider test results; and
  providing, by the network device and to a customer user interface, the correlated customer test results.

2. The method of claim 1, wherein the validation criteria includes a success criteria, a failure criteria, and a conditional criteria for each of the API level calls.

3. The method of claim 1, further comprising:
providing, by the network device, the customer user interface to solicit input from a customer for the test of the API level calls.

4. The method of claim 3, wherein the customer user interface to solicit input from the customer includes test configuration options including:
scheduling an ad hoc test,
scheduling periodic tests, and
configuring a test including less than all the technical steps.

5. The method of claim 3, wherein the customer user interface to present test results includes a status indicator to identify an operational status of each of the technical steps.

6. The method of claim 3, wherein the customer user interface to present test results includes historical information that identifies one or more of:
a last successful test,
a last successful execution, and
a last test failure.

7. The method of claim 1, wherein the type of service campaign includes:
a campaign for a particular use of internet services,
a campaign for machine-to-machine communications, or
a campaign for cloud-based services.

8. The method of claim 7, wherein the type of service campaign includes a campaign for toll-free data services.

9. The method of claim 1, wherein the API level calls include one or more of:
service provider API code stored within a service provider cloud infrastructure,
service provider API code stored within a customer cloud infrastructure,
service provider API code stored on customer servers within a customer network, and
service provider API code within an application stored on a customer device.

10. The method of claim 1, further comprising:
providing, by the network device, a provider user interface to solicit input from a service provider for the test of the API level calls and to present the correlated service provider test results to the service provider.

11. The method of claim 10, wherein the provider user interface to present test results to the service provider includes:
status indicators to identify an operational status of each of the technical steps, and
status indicators to identify an operation status of particular API level calls within each of the technical steps.

12. A device, comprising:
a memory configured to store a plurality of instructions; and
a processor configured to:
receive a collection of technical steps for implementing a type of service campaign, wherein the technical steps include application programming interface (API) level calls to a service provider network;
associate the technical steps with particular customer software;
receive validation criteria for each of the technical steps;
generate a diagnostic map of the technical steps for the particular customer software;
conduct, based on the diagnostic map, a test of the API level calls for the particular customer software to obtain test results;
receive a customer deployment record of customer changes occurring during software deployments on an application layer for the service campaign for the particular customer software;
receive a provider record of service provider changes to network level software that impact the service campaign for the particular customer software;
correlate the test results with the customer deployment record to obtain correlated customer test results; and
correlate the test results with the provider record to obtain correlated provider test results; and
providing, to a customer user interface, the correlated customer test results.

13. The device of claim 12, wherein the processor is further configured to:
provide the customer user interface to solicit customer input for the test of the API level calls.

14. The device of claim 13, wherein the API level calls include one or more of:
service provider API code stored within a service provider cloud infrastructure,
service provider API code stored within a customer cloud infrastructure,
service provider API code stored on customer servers within a customer network, and
service provider API code within an application stored on a customer device.

15. The device of claim 13, wherein, when providing the customer user interface, the processor is further configured to:
solicit, from a customer, a test schedule.

16. The device of claim 13, wherein, when providing the customer user interface, the processor is further configured to:
solicit, from the customer, a test plan including less than all the technical steps.

17. The device of claim 13, wherein, when providing the customer user interface, the processor is further configured to:
provide status indicators to identify an operational status of each of the technical steps.

18. A non-transitory computer-readable medium containing instructions executable by at least one processing unit, the computer-readable medium comprising one or more instructions for:
receiving a collection of technical steps for implementing a type of service campaign, wherein the technical steps include application programming interface (API) level calls to a service provider network;
associating the technical steps with particular customer software;
receiving validation criteria for each of the technical steps;
generating a diagnostic map of the technical steps for the particular customer software;
conducting, based on the diagnostic map, a test of the API level calls for the particular customer software to obtain test results;
receiving a customer deployment record of customer changes occurring during software deployments on an application layer for the service campaign for the particular customer software;

receiving a provider record of service provider changes to network level software that impact the service campaign for the particular customer software;

correlating the test results with the customer deployment record to obtain correlated customer test results; and correlating the test results with the provider record to obtain correlated service provider test results; and providing, to a customer user interface, the correlated customer test results.

19. The non-transitory computer-readable medium claim 18, further comprising one or more instructions for:

providing a customer user interface to solicit customer input for the test of the API level calls and to present test results.

20. The non-transitory computer-readable medium claim 19, further comprising one or more instructions for:

providing the provider user interface to solicit provider input for the test of the API level calls and a provider user interface to present additional test results than those provided in the customer user interface.

* * * * *